US010651619B2

(12) United States Patent
Trull-Silvestre et al.

(10) Patent No.: US 10,651,619 B2
(45) Date of Patent: May 12, 2020

(54) OPTICAL SYSTEM AND METHOD FOR ULTRASHORT LASER PULSE CHARACTERIZATION

(71) Applicants: UNIVERSITAT POLITECNICA DE CATALUNYA, Barcelona (ES); UNIVERSIDAD DE SALAMANCA, Salamanca (ES); SPHERE ULTRAFAST PHOTONICS, SA, Oporto (PT)

(72) Inventors: Jose Francisco Trull-Silvestre, Barcelona (ES); Crina Maria Cojocaru, Barcelona (ES); Inigo Juan Sola-Larranaga, Salamanca (ES); Rosa Maria Romero-Muniz, Oporto (PT); Francisco Jose Maia Da Silva, Oporto (PT); Helder Manuel Paiva Rebelo Cerejo Crespo, Oporto (PT)

(*) Notice: Subject to any disclaimer, the term of this patent is extended or adjusted under 35 U.S.C. 154(b) by 0 days.

(21) Appl. No.: 15/549,266
(22) PCT Filed: Feb. 5, 2016
(86) PCT No.: PCT/IB2016/000087
§ 371 (c)(1),
(2) Date: Aug. 7, 2017
(87) PCT Pub. No.: WO2016/125002
PCT Pub. Date: Aug. 11, 2016

(65) Prior Publication Data
US 2018/0034227 A1 Feb. 1, 2018

(30) Foreign Application Priority Data
Feb. 6, 2015 (EP) .................................. 15000347

(51) Int. Cl.
H01S 3/00 (2006.01)
G02F 1/37 (2006.01)
(Continued)

(52) U.S. Cl.
CPC .......... *H01S 3/0057* (2013.01); *G01J 3/2823* (2013.01); *G01J 11/00* (2013.01); *G02F 1/35* (2013.01);
(Continued)

(58) Field of Classification Search
CPC ....... G01J 11/00; G01J 3/2823; H01S 3/0014; H01S 3/0057; H01S 3/0092; H01S 3/06729; G02F 1/35; G02F 1/37
See application file for complete search history.

(56) References Cited

U.S. PATENT DOCUMENTS 9,397,463 B2 * 7/2016 Da Costa Ribeiro De Miranda ............... H01S 3/0092
9,816,861 B2 * 11/2017 Streeter ................. G01J 3/0205
(Continued)

OTHER PUBLICATIONS

C. Cojocaru, J. Trull, V. Roppo, Y. Sheng and W. Krolikowski, "Managing light in nonlinear disordered media," 2013 15th International Conference on Transparent Optical Networks (ICTON), Cartagena, 2013, pp. 1-4. doi: 10.1109/ICTON.2013.6602676. (Year: 2013).*
C. Cojocaru, J. Trull, V. Roppo, Y. Sheng and W. Krolikowski, "Managing light in nonlinear disordered media," 2013 15th International Conference on Transparent Optical Networks (ICTON), Cartagena, 2013, pp. 1-4. doi: 10.1109/ICTON.2013.6602676; (Year: 2013).*
(Continued)

*Primary Examiner* — Violeta A Prieto
(74) *Attorney, Agent, or Firm* — Eugenio J. Torres-Oyola; Victor M. Rodriguez-Reyes; Rafael Rodriguez-Muriel

(57) ABSTRACT

The optical system comprises: means for introducing a controlled negative or positive chirp to an incoming ultrashort laser pulse to be characterized; a nonlinear optical medium through which said chirped ultrashort laser pulse is propagated, wherein as a result of said propagation: different chirp values are introduced in the ultrashort laser pulse at
(Continued)

different propagation distances along the nonlinear optical medium, and a transverse nonlinear signal is generated in a direction perpendicular to the propagation axis; analyzing means configured for recording a single-shot spectral image of said generated transverse nonlinear signal; and a processing module comprising one or more processors configured to execute a numerical iterative algorithm to said single-shot spectral image to retrieve the electric field, amplitude and phase, of the ultrashort laser pulse.

6 Claims, 2 Drawing Sheets

(51) Int. Cl.
    *G01J 3/28*     (2006.01)
    *H01S 3/067*     (2006.01)
    *G01J 11/00*     (2006.01)
    *G02F 1/35*     (2006.01)

(52) U.S. Cl.
    CPC .............. *G02F 1/37* (2013.01); *H01S 3/0014* (2013.01); *H01S 3/0092* (2013.01); *H01S 3/06729* (2013.01)

(56) References Cited

U.S. PATENT DOCUMENTS

| | | | | |
|---|---|---|---|---|
| 2002/0057435 | A1* | 5/2002 | Trebino | G01J 11/00 356/450 |
| 2014/0321486 | A1* | 10/2014 | Da Costa Ribeiro De Miranda | H01S 3/0092 372/21 |
| 2016/0116338 | A1* | 4/2016 | Streeter | G01J 3/0205 356/300 |
| 2019/0170588 | A1* | 6/2019 | Maia Da Silva | G01J 11/00 |

OTHER PUBLICATIONS

D Dumay, S M Saltiel, D N Neshev, W Krolikowski, and Y S Kivshar, "Pulse measurements by randomly quasi phase matched second harmonic generation in the regime of total internal reflection," 2009 J. Phys. B: At. Mol. Op 2009 J. Phys. B: At. Mol. Opt. Phys. 42 175403 (Year: 2009).*

Miguel Miranda, Thomas Fordell, Cord Arnold, Anne L'Huillier, and Helder Crespo, "Simultaneous compression and characterization of ultrashort laser pulses using chirped mirrors and glass wedges," 2012, Opt. Express 20, 688-697, (Year: 2012).*

* cited by examiner

OPTICAL SYSTEM AND METHOD FOR ULTRASHORT LASER PULSE CHARACTERIZATION

CROSS-REFERENCE TO RELATED APPLICATION

This application is the national stage entry of International Application No. PCT/IB2016/000087, filed on Feb. 5, 2016, the contents of which are hereby incorporated by reference in their entirety, which in turn claims priority to Spanish Patent Application No. 15000347.3, filed on Feb. 6, 2015, the contents of which are hereby incorporated by reference in their entirety.

FIELD OF THE INVENTION

The present invention generally relates to laser systems and laser pulse characterization methods. In particular, the invention relates to an optical system and to a method for single-shot ultrashort laser pulse characterization via the detection of a transverse nonlinear signal (e.g. a second harmonic generation signal) generated in a nonlinear optical medium through which said ultrashort laser pulse is propagating.

BACKGROUND OF THE INVENTION

Since the construction of the first laser by Maiman in 1960 [1] one important scientific and technological goal in the field was to increase the power delivered by the laser beam and to explore novel phenomena that only occur for such high electromagnetic field intensities. The solution came with the pulsed lasers operating in the mode-locked regime, where the energy of the pulse is emitted in a very short temporal event. Nowadays, lasers with femtosecond (1 fs=$10^{-15}$ s) pulse durations can generate peak powers of the order of a Petawatt (1 PW=$10^{15}$ W). Optical pulses with durations ranging from a few optical cycles to hundreds of fs are so short that no direct method for their measurement exists. To this purpose, techniques based on nonlinear optical interactions (autocorrelation or cross-correlation diagnostics) are usually implemented. Although these methods can provide a good measurement of the pulse duration, they do not generally provide complete information about the spectral phase of the pulse that ultimately determines the pulse shape and duration. The complete characterization of such short events is therefore very important and often challenging.

Several methods that combine autocorrelation and spectral measurements have been proposed to overcome this issue and to obtain amplitude and phase reconstruction of the pulses [2-4]. Nowadays, the most used methods are different versions of either Frequency Resolved Optical Gating (FROG) or Spectral Phase Interferometry for Direct Electric Field Reconstruction (SPIDER). The FROG method relies on spectrally resolving time-gated signals and creates a spectrogram-like trace by spectrally resolving an autocorrelation signal and enables complete characterization of a given pulse by means of an iterative algorithm applied to the trace [5, 6]. On the other hand, the SPIDER method relies on interferometry in the spectral domain: the spectrum of a given pulse is made to interfere with a time and frequency shifted replica of itself, and the resulting spectral interferogram is recorded [7-9]. Both methods can provide very good results for pulses in the range of 20-200 fs. However, standard FROG and SPIDER devices are normally very sensitive to alignment and to phase-matching bandwidth requirements. Even if recent SPIDER-related methods have partially overcome this issue, in all of the above techniques the characterization of few-cycle laser pulses is still challenging and usually requires specific tuning and materials in order to accommodate the associated broad bandwidths of the pulses.

Another method for pulse characterization based on phase scanning, known as Multiphoton Intrapulse Interference Phase Scan (MIIPS) [10], was more recently introduced. A set of known spectral phases is applied to the pulse to be characterized, most usually via an active pulse shaping device, and the resulting second harmonic generated (SHG) signals are measured. By finding which locally introduced amount of group delay dispersion (GDD) results in compression at a given wavelength, an approximation to the original GDD of the pulse is directly obtained from a contour plot without the need of any mathematical retrieval procedure [11-13]. The pulse-shaping device is then programmed to introduce a GDD opposite to the measured one, and the whole experimental and numerical process must be repeated until a given spectral phase is achieved.

A more recent method is Self-Referenced Spectral Interferometry (SRSI), where a reference pulse with a flat spectral phase is collinearly generated from the input pulse by cross-polarized wave generation (XPW) in a nonlinear crystal. The spectral interference pattern resulting from the combination of the input pulse and the reference pulse allows direct retrieval of the spectral phase and intensity. This method however can only measure pulses with durations very close to the Fourier limit, and no more than 2 times this limit. Therefore, SRSI has a very limited tolerance to the input pulse chirp and a small measuring range compared to most other techniques. On the other hand, it can only measure amplified laser pulses, since XPW is a third-order nonlinear process that requires several micro Joules of energy per pulse in order to work.

A recently proposed method called dispersion-scan (d-scan) can retrieve the phase of ultrashort laser pulses by applying a set of known spectral phases by progressively inserting a wedge within a chirped mirror and wedge pair compressor and measuring the corresponding spectra of a nonlinear signal, such as the second harmonic generated in a phase-matched nonlinear crystal. Pulse retrieval is performed via a holistic iterative algorithm [14-16]. In the d-scan method a pulse compressor is used as part of the diagnostic tool itself. This method is very simple and robust compared with FROG or SPIDER. However, the implementation based on chirped mirrors and wedge compressor requires the phase to be scanned over the set of applied dispersion values by progressively moving one of the wedges. This approach works very well provided that the pulse train emitted by the laser has a stable spectrum and spectral phase, but cannot work in single-shot configuration, where measurement of all the data needed for the pulse reconstruction must be recorded in a single measurement and for a single pulse. The d-scan method requires several successive experimental steps, corresponding to different wedge insertions, to record all the data needed for the phase reconstruction. Single-shot methods are crucial for the characterization of the pulses provided by high power lasers with low repetition rates.

Therefore, the introduction of a new system (and method) that is compact, robust; less sensitive to alignment and wavelength, less expensive compared to existing technologies, while being capable of characterizing ultrashort laser pulses by recording all the data needed for pulse reconstruction in a single-shot configuration, is in high demand for ultrashort laser pulse development and applications.

SUMMARY OF THE INVENTION

Embodiments of the present invention address these and/or other needs by providing a system and method for measuring ultrashort laser pulses. It is a single-shot method and hence enables measuring single pulses. Single shot operation is very important for measuring lasers with low repetition rates, such as high-energy and high-power laser amplifiers. It also provides traces at video rates, which enables real time visualization and optimization of the laser pulses. Retrieval of the complete electric field (amplitude and phase) of the ultrashort laser pulses can be performed with the d-scan (or equivalent) algorithm.

To that end, in accordance with a first aspect there is provided an optical system for ultrashort laser pulse characterization, including:

means for introducing a controlled negative or positive chirp (or equivalently a controlled spectral phase) to an incoming ultrashort laser pulse to be characterized; (To be noted that a pulse is said to be chirped if its instantaneous frequency is time varying)

a nonlinear optical medium, with normal or anomalous dispersion, through which said (negatively or positively) chirped ultrashort laser pulse is propagated, said nonlinear optical medium having the property of generating a nonlinear signal from the chirped ultrashort laser pulse and emitting it transversally to the ultrashort laser pulse propagation direction; as a result of said propagation, different chirp values are introduced by the dispersion of the nonlinear optical medium in the ultrashort laser pulse at different propagation distances along the nonlinear optical medium, and a transverse nonlinear signal is generated in a direction perpendicular to the propagation axis from the dispersed ultrashort laser pulse having different chirp values introduced by the corresponding propagation distance within the nonlinear optical medium;

analyzing means configured for recording a single-shot spectral image of said transverse nonlinear signal generated in the direction perpendicular to the propagation axis, and a processing module comprising one or more processors configured to execute a numerical iterative algorithm, such as a d-scan algorithm, among others, for instance a Multiphoton Intrapulse Interference Phase Scan (MIIPS) algorithm or a Chirp Reversal Technique (CRT), to said recorded single-shot spectral image to retrieve the electric field, amplitude and phase, of the ultrashort laser pulse.

The optical system may further include a coupling module, arranged after the nonlinear optical medium and before the analyzing means, configured to couple the generated transverse nonlinear signal to said analyzing means.

Preferably, the analyzing means comprises an imaging spectrometer, not limitative as any other system(s) capable of measuring spectra as a function of position may be included as analyzing means. The imaging spectrometer may further include an imaging system such as a CCD or a CMOS camera.

In accordance with a preferred embodiment, the transverse nonlinear signal is a transverse second harmonic generation signal.

In typical autocorrelation methods, the efficiency of the second harmonic signal generated by the pulse to be characterized critically depends on the phase-matching condition (which imposes that the phase velocity at the fundamental and second harmonic wavelengths has to be the same). Phase-matching is usually achieved only for a particular propagation direction within the nonlinear optical medium and is fulfilled only for narrow spectral bandwidths. This becomes a problem when the laser pulse is ultrashort and consequently has a broad frequency bandwidth. To solve these problems, very thin nonlinear crystals, that require a critical alignment, are used in typical autocorrelators.

For that reason, according to the preferred embodiment the nonlinear optical media particularly includes a type of nonlinear crystal having a plurality of antiparallel ferroelectric domains with an inverted sign of the second order nonlinearity and randomized sizes and positions.

The nonlinear crystals used in the present invention with respect to all typical crystals used in other laser pulse characterization methods, eliminate both problems of critical alignment and phase-matching bandwidth. Due to the random size and distribution of the nonlinear inverted domains, the second harmonic signal is generated in a broadband wavelength range (400-2500 nm), which enables the use of long crystals. Moreover, the nonlinear crystal allows the second harmonic signal to be generated in a broad angular range, from the typical forward direction (parallel to the fundamental beam) up to 90 degrees when the second harmonic signal is generated in a direction perpendicular to the fundamental propagation direction. The latest case corresponds to the transverse second harmonic generation, which is impossible to be obtained using a birefringent nonlinear crystal (such as BBO, LBO, or KTP) or quasi-phase-matched crystals. Moreover, the nonlinear crystal does not need critical angular alignment or temperature tuning to get the same phase-matching efficiency over a very wide spectral range.

The nonlinear crystal may be an as grown multi-domain Strontium Barium Niobate (SBN) crystal. Alternatively, the nonlinear crystal may also be a multi-domain Calcium Barium Niobate (CBN) crystal, or a Strontium Tetraborate (SBO) crystal, among any other multi-domain crystal with random distribution and size of inverted second order nonlinear domains. These crystals may have normal or anomalous dispersion, depending on the wavelength range where they are used. In both cases, before the entrance into the nonlinear optical medium, a controlled dispersion opposite to the dispersion of the crystal has to be applied to the ultrashort laser pulse (by a pulse compressor or a stretcher module), such as provided by diffraction gratings, prisms, chirped mirrors, bulk optical media or optical fibres Bragg networks.

Embodiments of the present invention in accordance with a second aspect also provide a method for ultrashort laser pulse characterization, the method comprises:

introducing a controlled chirp (or equivalently a controlled spectral phase), negative or positive, to an incoming ultrashort laser pulse to be characterized;

propagating the (negatively or positively) chirped ultrashort laser pulse through a nonlinear optical medium that may have normal or anomalous dispersion and has the property of generating a nonlinear signal from the chirped ultrashort laser pulse trough a nonlinear process (e.g second or third harmonic generation and sum or difference frequency generation) and emitting it transversally to the ultrashort laser pulse propagation direction; as a result of said propagation, different chirp values are introduced by the dispersion of the nonlinear optical medium in the ultrashort laser pulse at different propagation distances along the nonlinear optical medium, and a transverse nonlinear signal (e.g. second harmonic generation signal) is generated in a direction perpendicular to the propagation axis from the dispersed ultrashort laser pulse having different chirp values introduced by the corresponding propagation distance within the nonlinear optical medium;

recording, by an analyzing means, a single-shot spectral image of said transverse nonlinear signal generated in the perpendicular direction of the propagation axis; and executing, by a processing module, a numerical iterative algorithm, to said recorded single-shot spectral image to retrieve the electric field of the ultrashort laser pulse. (Retrieving the electric field of an ultrashort laser pulse means to obtain/determine the amplitude and phase of such ultrashort laser pulse).

The proposed method, by measuring the spectrum of the generated transverse nonlinear signal from the ultrashort laser pulse for different values of the chirp in the laser pulse, where the chirp is induced by the dispersion of the nonlinear optical medium itself as the ultrashort laser pulse propagates through it, without the need of wedge scanning or of using other step by step moving parts for performing the dispersion scan, can generate all the data needed by, for instance, the d-scan method [14-16] in a single-shot configuration. Moreover, the proposed method eliminates phase-matching requirements due to the nonlinear optical medium characteristics. Thus, laser pulse reconstruction can be performed for a same set-up at different central wavelengths, while the laser pulse duration range extends from few-cycle regimes to the hundreds of fs.

BRIEF DESCRIPTION OF THE DRAWINGS

The previous and other advantages and features will be more fully understood from the following detailed description of embodiments, with reference to the attached drawings, which must be considered in an illustrative and non-limiting manner, in which.

DETAILED DESCRIPTION OF SEVERAL EMBODIMENTS

Figure 1:
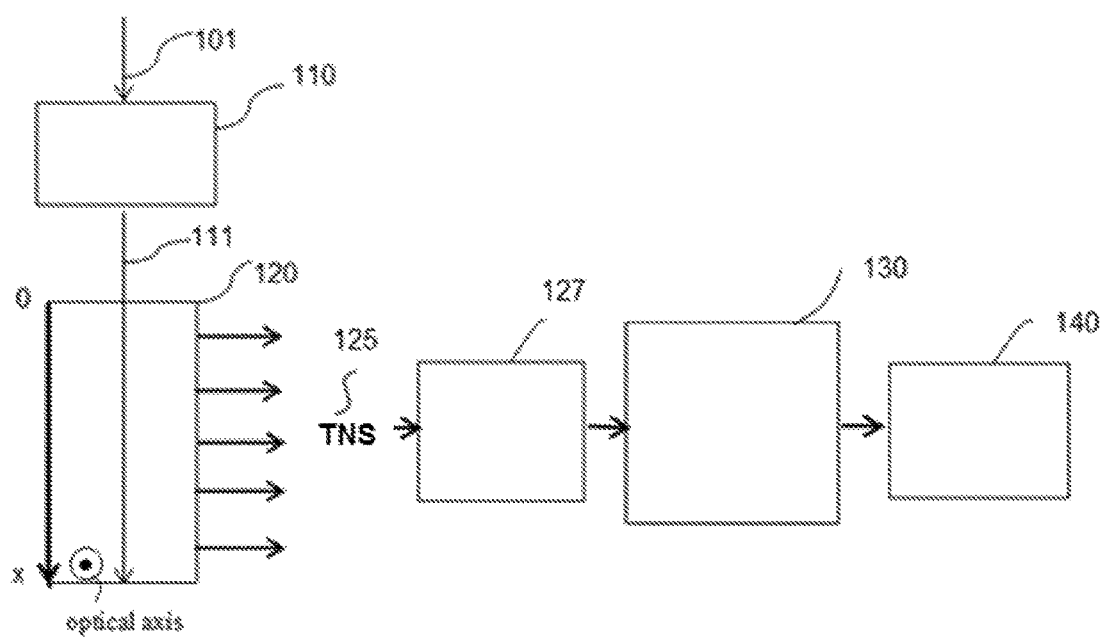
FIG. 1 is a schematic illustration showing the set-up provided by the present invention to characterize ultrashort laser pulses.

FIG. 1 illustrates a preferred embodiment of the proposed optical system which includes: means 110 for introducing a controlled chirp (or spectral phase), that can be negative or positive, to an inputted ultrashort laser pulse 101 to be characterized/measured; a nonlinear optical medium 120, with normal or anomalous dispersion, through which said chirped ultrashort laser pulse is propagated (in Ox direction), perpendicular to the optical axis of the crystal, and generates a transverse nonlinear signal (TNS), such as a transverse second harmonic generation signal (TSHG), 125; a coupling module 127 that couples the generated transverse nonlinear signal 125 to an analyzing unit/means 130; the analyzing means 130, preferably comprising an imaging spectrometer; and a processing module 140 comprising one or more processors executing a numerical iterative algorithm such as a d-scan algorithm [13-15].

In case the nonlinear optical medium 120 has normal dispersion, the means 110, which introduces the controlled chirp to the input ultrashort laser pulse to be measured 101, comprises elements which introduce anomalous dispersion such as chirped mirrors, prisms, diffraction gratings, optical fibers, etc. Alternatively, in case the nonlinear optical medium 120 has anomalous dispersion, the means 110 comprises elements with normal dispersion such as bulk optical media, optical fibers, etc.

Dispersion-scan (d-scan) [14-16] is a powerful technique for the simultaneous measurement and compression of femtosecond laser pulses. Laser pulse characterization through d-scan is based on the fact that when a pulse undergoes a nonlinear frequency conversion process, such as second-harmonic generation, the resulting spectral intensity has a well-defined dependence on the input spectral phase. By measuring the spectrum of the nonlinear signal for different input phases around the point of maximum laser pulse compression, a two-dimensional d-scan trace can be obtained which enables the full retrieval of the spectral phase of the laser pulses via a multiple steps iterative algorithm. The d-scan has a totally inline and robust setup, without the need of any beam-splitting or interferometric precision.

The d-scan algorithm allows retrieving the electric field of the ultrashort laser pulse 101 to be characterized by measuring the nonlinear signal spectrum as a function of dispersion (measured d-scan trace) and subsequently minimizing a defined error function. The iterative algorithm of d-scan works essentially with two different sets of input parameters: (a) either the iterative algorithm has as input the measured d-scan trace and the linear spectrum of the ultrashort laser pulse; or (b) the iterative algorithm has as input the measured d-scan trace. In the case (a) the algorithm finds the phase value for each wavelength that minimizes the error function, whereas in the case (b), finds the phase and linear spectrum for each wavelength that minimizes the error function. The error function is the RMS error between the measured d-scan trace and the simulated d-scan trace, obtained from the simulated phase and the linear spectrum (either measured or simulated). This simulated d-scan trace is updated for every iteration step until the error function is minimized. This error function can also be written to be minimized for all wavelengths (global error) or can be written to be minimized for each wavelength (local error).

According to the preferred embodiment of FIG. 1, the ultrashort laser pulse 101 to be characterized, or measured, is (negatively or positively) pre-chirped, in this particular case by means of a pulse compressor 110, in order to introduce a controlled negative dispersion therein, and then propagated through the nonlinear optical medium 120.

According to this preferred embodiment, the nonlinear optical medium 120 is a nonlinear crystal (e.g. a SBN, a CBN, a SBO, among others) possessing antiparallel ferroelectric domains with randomized sizes and positions and inverted sign of the second order nonlinearity, which provide a phase-matched second harmonic signal in a very wide spectral range (limited only by the crystal transparency window). Because of this particular property of the nonlinear crystal, the transverse nonlinear signal 125 is generated with the same efficiency for all spectral frequencies of the ultrashort laser pulse 111 and does not require any angular alignment or temperature tuning. This supposes a great advantage over the typically used quadratic nonlinear crystals, where the phase-matching condition strictly depends on the wavelength, requires a very sensitive alignment and the use of very thin crystals (with thickness in the few micron range).

On the other hand, when the fundamental beam propagates perpendicularly to the optical axis of the nonlinear crystal (Ox direction in FIG. 1), the second harmonic signal is generated in a whole plane perpendicular to the optical axis of the nonlinear crystal, including the direction perpendicular to the ultrashort laser pulse propagation direction (or transverse nonlinear signal 125) which is of particular interest for this invention. In the same time, due to the intrinsic dispersion of the nonlinear crystal, different chirp values are introduced in the ultrashort laser pulse 111 (negatively or positively pre-chirped) while it propagates along the nonlinear crystal. Therefore, the nonlinear crystal generates the dispersion-dependent transverse nonlinear signal 125, without the need of scanning the dispersion by using glass wedges (or other dispersive optical elements) as in the standard d-scan implementation.

Figure 2:
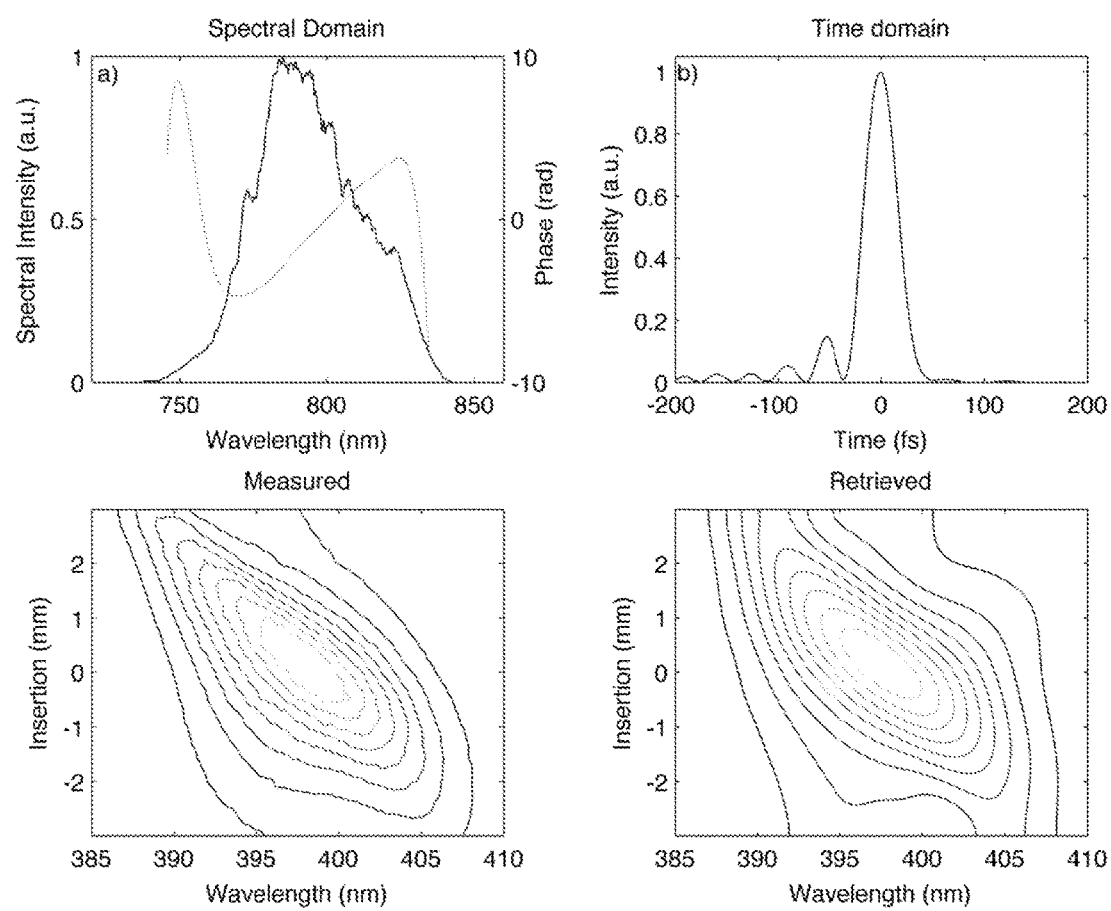
FIG. 2 illustrates a measured wavelength—position trace of a femtosecond laser pulse obtained using an SBN nonlinear crystal, and the corresponding laser pulse retrieval from a single-shot measurement. Top: spectrum and spectral phase (left) and laser pulse intensity in the time domain (right). Bottom: measured (left) and retrieved (right) single-shot d-scan traces; the term 'Insertion' seen in the left axis refers to the position within the nonlinear crystal along the propagation direction (OX), which corresponds a corresponding amount of applied dispersion to the input ultrashort laser pulse. Zero (0) insertion is defined as the position within the nonlinear crystal for which maximum laser pulse compression is obtained.

Once the transverse nonlinear signal 125 is generated along the nonlinear crystal, it is coupled trough the coupling module 127 (e.g. an optical module) to the analyzing means 130, preferably comprising as said before an imaging spectrometer that may further include an imaging system such as a. CCD or a CMOS camera (among any other types of cameras). The analyzing means 130 can record in a single spectral image the transverse nonlinear signal 125 spectra as a function of the propagation distance within the nonlinear crystal, giving the evolution of the second harmonic signal as a function of dispersion. By recording a single spectral image of the transverse nonlinear signal 125, the method proposed in this invention effectively obtains a single-shot measurement of the second harmonic spectrum as a function of dispersion. The single-shot 2D d-scan trace obtained from this measurement, combined with an independently measured linear spectrum of the fundamental inputted ultrashort laser pulse 101, or alternatively using only the single-shot d-scan trace, contains all the information needed to fully reconstruct the amplitude and phase of the ultrashort laser pulse 101. This reconstruction is given by the processing module 140. Applying the corresponding numerical algorithm the ultrashort laser pulse 101 can be fully reconstructed in the time domain. An example of pulse retrieval performed with this method is shown in FIG. 2.

The proposed method with respect to the d-scan or other pulse characterization methods modifies the spectral phase (chirp) of the ultrashort laser pulse in a controlled and well-known way only by the intrinsic dispersion of the nonlinear medium 120. In addition, the generated transverse nonlinear signal 125 allows single-shot measurement of the second harmonic spectrum as a function of the propagation distance, hence applied spectral phase, within the nonlinear medium 120. The output trace given by the single-shot measurement is similar to the one obtained in several steps with the standard d-scan method and hence contains all needed data to reconstruct the spectral phase (and the electric field) of the pulse with the iterative numerical algorithm.

The nonlinear medium 120 with high dispersion allows reconstructing laser pulses with relatively narrow spectra (e.g.: a spectral width of 10 nm FWHM at 800 nm, consistent with a pulse duration of 100 fs FWHM). On the other hand, the broadband second harmonic generation signal allows the reconstruction of few-cycle laser pulses or laser pulses centered at different wavelengths (e.g. emitted from a nonlinear optical parametric device).

It has to be noted that even though in the present description only the d-scan algorithm has been described for performing the processing of all the generated data (due to its robustness and simplicity with regard to other characterization algorithms) to allow the characterization of the laser pulse 101 in a single-shot configuration, other processing algorithms (like for example the MIIPS algorithm, or the recent Chirp Reversal Technique (CRT) by Loriot, Gitzinger and Forget [17] can also be used by the present invention.

While certain embodiments have been described, these embodiments have been presented by way of example only, and are not intended to limit the scope of the protection. Indeed, the novel methods and apparatuses described herein may be embodied in a variety of other forms.

The accompanying claims and their equivalents are intended to cover such forms or modifications as would fall within the scope and spirit of the protection.

REFERENCES

[1] Th. Maiman, "Stimulated optical radiation in ruby," Nature 187, 493-494 (1960)
[2] K. Naganuma; K. Mogi; Yamada; "General method for ultrashort light pulse chirp measurement" Quantum Electronics, IEEE Journal of, vol. 25, no. 6, 1225-1233, (1989).
[3] A. Baltuska, Z. Wei, M. S. Pshenichnikov, D. A. Wiersma, and R. Szipocs, "All-solid-state cavity-dumped sub-5-fs laser," Appl. Phys. B 65, 175-188 (1997)
[4] J. W. Nicholson, J. Jasapara, W. Rudolph, F. G. Omenetto, and A. J. Taylor, "Full-field characterization of femtosecond pulses by spectrum and cross-correlation measurements," Opt. Lett. 24, 1774-1776 (1999).
[5] D. J. Kane; R. Trebino; "Characterization of arbitrary femtosecond pulses using frequency-resolved optical gating" Quantum Electronics, IEEE Journal of, vol. 29, no. 2, pp. 571-579, February 1993.
[6] R. Trebino and D. J. Kane, "Using phase retrieval to measure the intensity and phase of ultrashort pulses: frequency-resolved optical gating," J. Opt. Soc. Am. A 10, 1101-1111 (1993).
[7] C. Iaconis and I. A. Walmsley, "Spectral phase interferometry for direct electric-field reconstruction of ultrashort optical pulses," Opt. Lett. 23, 792-794 (1998).
[8] A. S. Wyatt, I. A. Walmsley, G. Stibenz, and G. Steinmeyer, "Sub-10 fs pulse characterization using spatially encoded arrangement for spectral phase interferometry for direct electric field reconstruction," Opt. Lett. 31, 1914-1916 (2006).
[9] J. R. Birge, Helder M. Crespo, and Franz X. Kartner, "Theory and design of two-dimensional spectral shearing interferometry for few-cycle pulse measurement," J. Opt. Soc. Am. B 27, 1165-1173 (2010).
[10] V. V. Lozovoy, I. Pastirk, and M. Dantus, "Multiphoton intrapulse interference. IV. Ultrashort laser pulse spectral phase characterization and compensation," Optics Letters, Vol. 29, pp. 775-777 (2004)
[11] V. V. Lozovoy, I. Pastirk, and M. Dantus, "Multiphoton intrapulse interference. IV. Ultrashort laser pulse spectral phase characterization and compensation," Opt. Lett. 29(7), 775-777 (2004).

[12] B. Xu, J. M. Gunn, J. M. D. Cruz, V. V. Lozovoy, and M. Dantus, "Quantitative investigation of the multiphoton intrapulse interference phase scan method for simultaneous phase measurement and compensation of femtosecond laser pulses," J. Opt. Soc. Am. B 23(4), 750-759 (2006).

[13] Y. Coello, V. V. Lozovoy, T. C. Gunaratne, B. Xu, I. Borukhovich, C.-H. Tseng, T. Weinacht, and M. Dantus, "Interference without an interferometer: a different approach to measuring, compressing, and shaping ultrashort laser pulses," J. Opt. Soc. Am. B 25(6), A140-A150 (2008).

[14] M. Miranda, C. L. Arnold, Thomas Fordell, F. Silva, B. Alonso, R. Weigand, A. L'Huillier, and H. Crespo, "Characterization of broadband few-cycle laser pulses with the d-scan technique," Opt. Express 20, 18732-18743 (2012).

[15] M. Miranda, T. Fordell, C. Arnold, A. L'Huillier, and H. Crespo, "Simultaneous compression and characterization of ultrashort laser pulses using chirped mirrors and glass wedges," Opt. Express 20, 688-697 (2012).

[16] Patent application WO-A1-2013/054292

[17] V. Loriot, G. Gitzinger, and N. Forget, "Self-referenced characterization of femtosecond laser pulses by chirp scan," Optics Express, Vol. 21, pp. 24879-24893 (2013)

What is claimed is:

1. An optical system for ultrashort laser pulse characterization, comprising:
    an element to introduce a controlled chirp, negative or positive, to an incoming ultrashort laser pulse to be characterized, said ultrashort laser pulse being a single laser pulse;
    a nonlinear optical element, with normal or anomalous dispersion, through which said chirped single ultrashort laser pulse is propagated, said nonlinear optical element having the property to generate a nonlinear signal from the ultrashort laser pulse and to emit the generated nonlinear signal transversally to the propagation direction, wherein as a result of said propagation:
        different chirp values are introduced by the dispersion of the nonlinear optical element itself in the ultrashort laser pulse at different propagation distances along the nonlinear optical element, and
        a transverse nonlinear signal is generated in a direction perpendicular to the propagation axis from said ultrashort laser pulse having different chirp values introduced by the corresponding propagation distance within the nonlinear optical element, said transverse nonlinear signal being a transverse second harmonic generation signal (TSHG);
    an analyzing unit comprising an imaging spectrometer configured to record a single-shot spectral image of said generated transverse nonlinear signal; and
    a processing module comprising one or more processors configured to execute a numerical iterative algorithm to said recorded single-shot spectral image to retrieve the electric field, amplitude and phase, of the single ultrashort laser pulse, thereby laser pulse reconstruction being possible to be performed with the same set-up at different central wavelengths, while the laser pulse duration range extends from few-cycle regimes to the hundreds of femtoseconds.

2. The optical system of claim 1, wherein the nonlinear optical element comprises a nonlinear crystal having a plurality of antiparallel ferroelectric domains with inverted sign of the second order nonlinearity and randomized sizes and positions.

3. The optical system of claim 1, wherein the nonlinear optical element comprises at least one of: Strontium-Barium Niobate, or SBN, crystals, Calcium Barium Niobate, or CBN, crystals, or Strontium Tetraborate, or SBO, crystals.

4. A method for ultrashort laser pulse characterization, comprising:
    introducing, by an element, a controlled chirp, negative or positive, to an incoming ultrashort laser pulse to be characterized, said incoming ultrashort laser pulse to be characterized being a single laser pulse;
    propagating the chirped single ultrashort laser pulse through a nonlinear optical element with normal or anomalous dispersion and having the property of generating a nonlinear signal from the ultrashort laser pulse and emitting the generated nonlinear signal transversally to the propagation direction, wherein as a result of said propagation, different chirp values are introduced by the dispersion of the nonlinear optical element itself in the ultrashort laser pulse at different propagation distances along the nonlinear optical element, and a transverse nonlinear signal is generated in a direction perpendicular to the propagation axis from said ultrashort laser pulse having different chirp values introduced by the corresponding propagation distance within the nonlinear optical element, said transverse nonlinear signal being a transverse second harmonic generation signal (TSHG);
    recording, by an analyzing unit, a single-shot spectral image of said generated transverse nonlinear signal, said analyzing unit comprising an imaging spectrometer; and
    executing, by a processing module comprising one or more processors, a numerical iterative algorithm, to said recorded single-shot spectral image to retrieve the electric field, amplitude and phase, of the single ultrashort laser pulse, thereby laser pulse reconstruction being possible to be performed with the same set-up at different central wavelengths, while the laser pulse duration range extends from few-cycle regimes to the hundreds of femtoseconds.

5. The method of claim 4, wherein the nonlinear optical element nonlinear crystal having a plurality of antiparallel ferroelectric domains with inverted sign of the second order nonlinearity and randomized sizes and positions.

6. The method of claim 4, wherein the nonlinear optical element comprises at least one of: Strontium-Barium Niobate, or SBN, crystals, Calcium Barium Niobate, or CBN, crystals, or Strontium Tetraborate, or SBO, crystals.

* * * * *